United States Patent [19]
Kaufman

[11] 3,875,601
[45] Apr. 8, 1975

[54] WIRE UNTWISTING, CUTTING AND STRIPPING TOOL

[76] Inventor: Harry Kaufman, 44 Highridge Rd., New Rochelle, N.Y.

[22] Filed: Oct. 5, 1973

[21] Appl. No.: 403,802

[52] U.S. Cl. ............................. 7/14.1 R; 81/9.5 R
[51] Int. Cl. ........................................... H02g 1/12
[58] Field of Search ......... 7/14.1 R; 81/9.5 R, 9.5 A

[56] References Cited
UNITED STATES PATENTS
3,736,606   6/1973   Raum et al. ...................... 7/14.1 R

*Primary Examiner*—Al Lawrence Smith
*Assistant Examiner*—Roscoe V. Parker

[57] ABSTRACT

A wire untwisting, cutting and stripping tool for twisted wires is described. The novel tool features include a slideable rod for supporting the stripper and which is prevented from rotating by a non-circular cross-section, adjustable shock-absorbing means on the rod end, pivotable untwisting jaws coupled to the cutter and operable therewith, means for adjusting the spacing between the untwister and cutter, and improved constructions of the untwister, cutter and stripper means.

9 Claims, 5 Drawing Figures

WIRE UNTWISTING, CUTTING AND STRIPPING TOOL

This invention relates to a tool for untwisting, cutting, and stripping the insulation from the ends of a plurality of twisted electrical wires, and is especially useful with twisted wire pairs commonly used in telephony.

A known tool, one form of which is described in U.S. Pat. No. 3,736,606, comprises a handle supporting a pair of fixed untwisting or ironing blades and a spring-biased slide supporting insulation stripper blades aligned with the untwisting blades. A wire cutter may also be mounted on the handle remote from the stripper blades.

The known tool exhibits certain disadvantages which are overcome in the improved tool in accordance with the present invention and which will be clearer from the detailed description that follows of several exemplary embodiments in accordance with the invention taken in conjunction with the accompanying drawings wherein.

Figure 1:
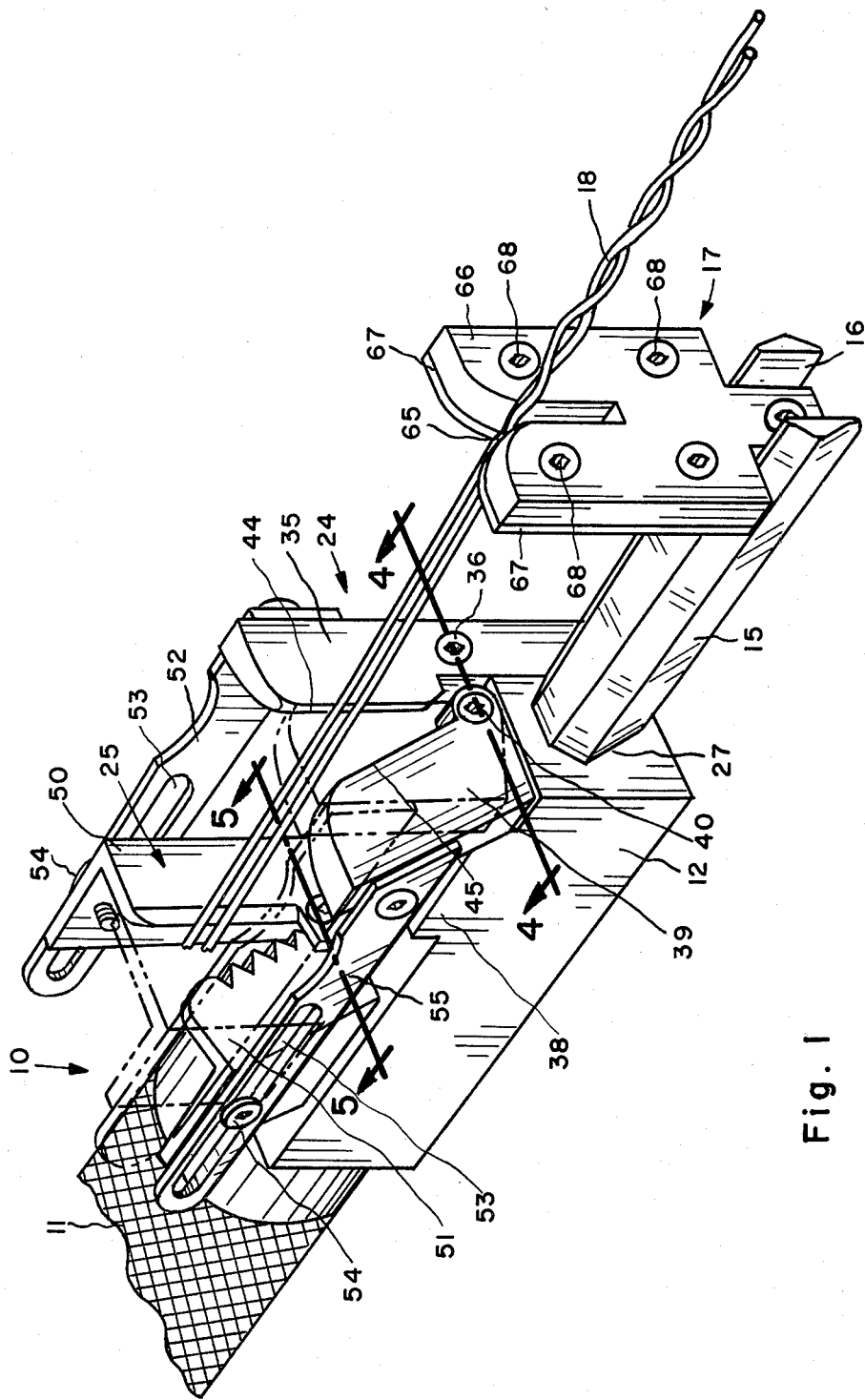
FIG. 1 is a perspective view of one form of tool in accordance with the invention with the stripper pulled out by a twisted wire.
Figure 2:
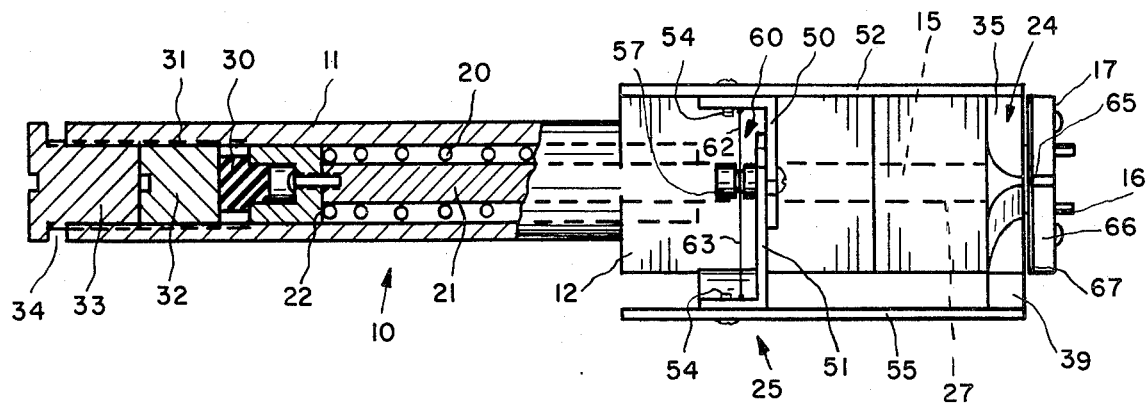
FIG. 2 is a top view, partly in cross-section, of the tool of FIG. 1 but with the stripper in its closed position.

One form of tool in accordance with the invention comprises an elongated, tubular handle member 10 having at one end a portion 11 for being grasped by the hand of a user and at the opposite end a mounting portion 12. Extending within the hollow handle 10 is a slideable rod 15 having an external mounting portion 16 for receiving a wire insulation stripper 17. The rod 15 is slideable from a closed position illustrated in FIG. 2 wherein the stripper 17 abuts nearly against the handle end 12, to an open position as illustrated in FIG. 1 wherein the rod 15 is pulled out of the handle while a wire 18 is being untwisted. The rod 15 is biased into its closed position by a spring 20 enclosing the rod shank 21 within the handle, which shank 21 is widened 22 at the rear to serve as a stop to prevent the slide from being completely pulled out of the hollow handle. Supported on the mounting portion 12 of the handle adjacent the stripper is an untwisting device 24 comprising a pair of untwisting jaws. Spaced from the untwisting jaws and remote from the stripper 17 is a wire cutter 25 comprising a pair of cutting jaws. The tool as so far described and its mode of operation is known in the art, and the present invention offers a number of important improvements over the known tool.

In the tool of the present invention, in order to maintain the stripper 17 aligned with the untwister 24 and cutter 25, the rod 15 must be prevented from turning or rotating. This is accomplished by providing the rod 15 with at least a portion that is non-circular and which engages a correspondingly shaped non-circular hole 27 in the handle. As shown in FIG. 1, the rod may be hexagonal engaging a hexagonal hole. Alternatively, it may be square, rectangular or D-shaped, or generally any non-circular shape permitting axial sliding thereof but no rotation. In the prior art tool, a slot was formed in the handle and engaged by a pin mounted in the shank. The present inventive arrangement in comparison reduces the size and weight of the tool and eliminates the possibility of shearing of the pin after numerous impacts with the handle slot.

In order to prevent damage to the stripper 17 by impact with the handle 12 on its return stroke, a relatively light spring 20 is used. In addition, in accordance with another feature of the invention, means are provided to prevent impact of the stripper jaws 17 with the handle. This result is obtained as follows. A shock-absorber 30 is mounted on the end 22 of the rod shank 21 within the handle. It may take the form, for example, of a rubber or plastic bumper. The handle tube 11 is at least partly internally threaded, as shown at 31. The thread is engaged by a first set screw 32 whose position within the handle can be adjusted by rotation with a screw driver from the back. The set screw 32 is adjusted so that it is impacted by the bumper 30, stopping the return stroke of the rod 15, just before the wire stripper 17 impacts the handle end 12. The position of the first set screw 32 is locked by a second set screw 33 which also threadingly engages the same internal thread 31 until it abuts the first set screw 32 and locks its position. Sufficient clearance is provided at 34 to ensure the proper functioning of the two set screws taking into account occasional readjustment of the set screws to compensate for normal wear of the bumper during use.

Figure 3:
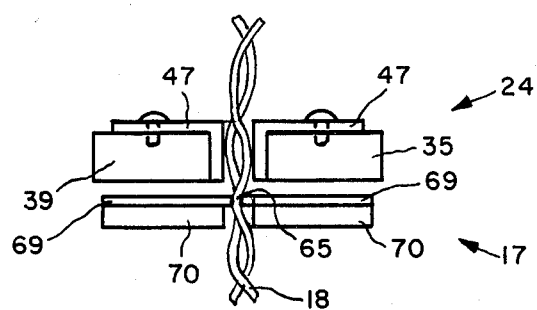
FIG. 3 is a detail top view of the tool of FIG. 1 with a modified form of untwister and stripper.
Figure 4:
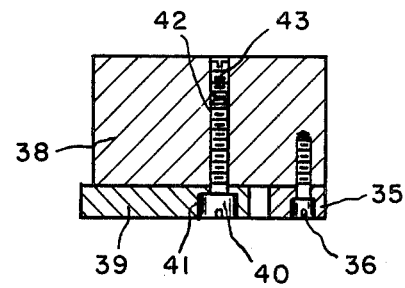
FIG. 4 is a detail cross-sectional view showing the pivot construction of the untwister.

A further feature of the invention is the use of pivotable untwister jaws instead of fixed untwister jaws as in the prior art tool. As illustrated in FIG. 1, a fixed untwister jaw 35 is mounted as by screws 36 on the end face of the mounting portion 12. The latter is provided with a platform section 38 to which is mounted a pivotable untwister jaw 39. The pivot connection consists (see FIG. 4) of a first set screw 40 with a head which is fitted with a small clearance through an untapped hole 41 at the bottom of the pivotable jaw 39 and which engages a tapped hole 42 which extends completely through the platform section 38. This first set screw 40 is tightened until the pivotable jaw 39 pivots firmly and smoothly, and then a second back-up set screw 43 is threaded into the hole 42 from the opposite side until it abuts and locks the position of the first set screw 40. This construction prevents tilting of the untwister movable jaw 39, permits proper adjustment for smooth and accurate movement, and also helps ensure proper alignment of the pivot axis with that of the cutter jaws. When the pivotable jaw 39 is closed on the wire, an untwisting slot is formed which is aligned with the stripper slot and which will untwist the wires as they are pulled through the jaws. Thus, the jaw working edges 44, 45 are given a smooth configuration to prevent damage to the wires. While the use of metal jaws gives longer life, it is preferred to provide plastic cover pieces, for example, of Teflon, over the jaws to widen the contact area with the wire and reduce the possibility of bends in the stripped wire ends. This is illustrated in FIG. 3, which shows Teflon cover pieces 47 screwed onto the jaws 35, 39 to form the wire contact surfaces. When worn, the cover pieces can be replaced.

An advantage of the pivotable untwister jaws is to enable the user to apply by hand just the amount of pressure against the wires necessary to enable them to be untwisted as they are pulled through. Moreover, movable jaws automatically compensate for jaw surfaces wear.

Figure 5:
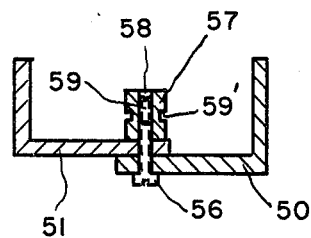
FIG. 5 is a detail cross-sectional view showing the pivot construction of the cutter.

Mounted further back over the handle mounting portion 12 is the wire cutter 25 comprising fixed 50 and movable 51 jaws. In accordance with a further feature of the invention, in order to ensure proper alignment of the cutter 25 and untwister 24, the former is mounted on the latter and the movable jaws 39, 51 are interconnected by a brace so as to move conjointly. Moreover, the interconnection is such as to permit axial adjustment of the spacing between the two, therefore to enable control of the length of stripped wire. In a preferred embodiment, the fixed jaws 35, 50 are interconnected by a bar 52 having a slot 53 enabling axial positioning of the cutter jaw when its mounting screw 54 is loosened. A similar bar 55 construction interconnects the two movable jaws 39, 51. The two bars 52, 55 also support the cutter jaws 50, 51 just above the surface of the handle mounting portion 12. The pivotable connection of the movable cutter jaw is similar to that of the untwister. As shown in FIG. 5, a first set screw 56 extends through clearance holes at the base of both jaws 50, 51 and is anchored in a sleeve member 57 having a tapped through hole 58. After the first set screw has been adjusted to provide smooth, nontilting motion by the movable jaw 51, a back-up second set screw 59 is threaded into the hole 58 until it abuts and locks the position of the first set screw 56. The sleeve 57 is also provided with a slot 59' to accommodate a spring 60 whose arms 62, 63 engage the inside of the cutter jaws 50, 51 to bias them into their open position. The spring arms 62, 63 are maintained in position by the protruding ends of the support screws 54.

The stripper 17 may be of conventional construction, and more specifically of the type employing a stripper slot 65 whose width matches that of the metal wire core, backed up by a suitable support 66, which is known in the art. It is preferred to use a construction comprising separate replaceable blades 67 mounted as by screws 68 on a sturdy support 66 and defining the stripping slot 65, as depicted in FIG. 1, but a less expensive construction can employ a thin blade 69 having the slot 65 backed up by a support 70, as depicted in FIG. 3.

The operation is similar to that of the known tool, except for the closing of the untwister jaws. The operator places the twisted pair 18 into the stripping slot 65 so that the free wire ends extend through the open untwister 39 and cutter 51 jaws. Next, the operator with his thumb closes the cutter and untwister jaws 51, 39, cutting off the excess wire, and then with his other hand pulls the wires 18 through the untwister 24 and stripper 17. During this process, the stripper 17 held by the cut insulation to the wire gets pulled axially outwardly on its slideable rod 15. As the moving wires are pulled through the still-held-closed untwister jaws, they become untwisted and straightened. As the wire ends clear the untwister 24, depending upon the location the rod stop 22 and the tightness of its return spring 20, the insulation will strip off of the untwisted ends of the wires, whereupon the return spring 20 returns the rod 15 to its starting position. Using a light return spring produces less impact on return and less of a tendency to kink the wire ends. Straighter wire ends are easier to insert into the bit of the usual wire-wrapping tool.

While my invention has been described in connection with specific embodiments thereof, those skilled in the art will recognize that various modifications are possible within the principles enunciated herein and thus the present invention is not to be limited to the specific embodiments disclosed.

What is claimed is:

1. A tool for cutting, untwisting and stripping the insulation from twisted wires, comprising an elongated handle member, a spring biased rod slideably mounted within the handle, a wire stripper mounted on the slideable rod, wire untwisting means mounted on the handle end adjacent the wire stripper, wire cutting means mounted on the handle on the side of the wire untwisting means remote from the wire stripper, said rod being slideable from a closed position wherein the wire stripper lies adjacent the untwisting means to an open position wherein the wire stripper is spaced from the untwisting means, said spring biasing the rod to its closed position, means for preventing rotation of the rod in order to maintain the cutting, untwisting and stripping means in aligned relationship, said rotation preventing means comprising a non-circular cross-section on said rod engaging a correspondingly-shaped opening in the handle, shock absorbing means within the handle and mounted on the end of the rod remote from the wire stripper, and return limiting means connected to the handle and located in a position to be impacted by the shock-absorbing means on the return of the rod from its open to its closed position and just before the wire stripper impacts the handle.

2. A tool as claimed in claim 1 wherein the interior of the handle is threaded, the impact means comprises a first set screw threaded inside the handle, and further including a second locking set screw also threaded inside the handle and engaging the first set screw.

3. A tool as claimed in claim 2 wherein the rod cross-section is hexagonal.

4. A tool for cutting, untwisting and stripping the insulation from twisted wires, comprising an elongated handle member, a spring-biased rod slideably mounted within the handle, a wire stripper comprising upstanding stripping jaws defining a stripping slot mounted on the slideable rod, wire untwisting means mounted on the handle end adjacent the wire stripper, said wire untwisting means comprising a fixed untwisting jaw and a pivotable untwisting jaw forming with the fixed jaw when closed a wire untwisting slot aligned with the stripping slot, a wire cutter located on the side of the wire untwister remote from the wire stripper, said wire cutter comprising a fixed cutting jaw and a pivotable cutting jaw forming when closed a cutting slot aligned with the untwisting and stripping slots, and means for connecting the movable untwisting jaw to the movable cutting jaw whereby the two movable jaws pivot together.

5. A tool as claimed in claim 4 and further comprising means interconnecting the cutting jaws and the untwisting jaws whereby the former are supported on the latter, and means for adjusting the spacing between the cutting jaws and the untwisting jaws.

6. A tool as claimed in claim 4 wherein the untwisting jaws comprise metal members covered with replaceable plastic cover pieces which engage the wires during the untwisting operation.

7. A tool as claimed in claim 4 wherein the movable untwisting jaw is pivoted on the handle, and the pivot connection is formed by a first set screw which controls the play between the fixed and movable jaws and a second set screw engaging the same threaded hole as the first set screw and engaging the latter to lock its position.

8. A tool as claimed in claim 7 wherein the movable cutting jaw is pivoted on the fixed cutting jaw, and the pivot connection is formed by a first set screw which controls the play between the fixed and movable cutting jaws and a second set screw engaging the same threaded hole as the first set screw and engaging the latter to lock its position.

9. A tool as claimed in claim 4 and further comprising rod slide stop means located on the rod end remote from the wire stripper.

* * * * *